US009743184B2

(12) United States Patent
Kouthoofd et al.

(10) Patent No.: US 9,743,184 B2
(45) Date of Patent: Aug. 22, 2017

(54) WIRELESS SPEAKER ARRANGEMENT

(71) Applicant: Teenage Engineering AB, Stockholm (SE)

(72) Inventors: Jesper Kouthoofd, Stockholm (SE); David Möllerstedt, Stockholm (SE); Anders Halvarsson, Sjömarken (SE); David Eriksson, Stockholm (SE); Jens Rudberg, Stockholm (SE); Marcus Nilsson, Stockholm (SE); Bengt Sjölén, Stockholm (SE)

(73) Assignee: TEENAGE ENGINEERING AB, Stockholm (SE)

( * ) Notice: Subject to any disclaimer, the term of this patent is extended or adjusted under 35 U.S.C. 154(b) by 0 days.

(21) Appl. No.: 14/758,652

(22) PCT Filed: Dec. 20, 2013

(86) PCT No.: PCT/SE2013/051585
§ 371 (c)(1),
(2) Date: Jun. 30, 2015

(87) PCT Pub. No.: WO2014/107131
PCT Pub. Date: Jul. 10, 2014

(65) Prior Publication Data
US 2016/0007115 A1 Jan. 7, 2016

(30) Foreign Application Priority Data
Jan. 7, 2013 (SE) ....................................... 1350011

(51) Int. Cl.
*H04B 3/00* (2006.01)
*H04R 3/12* (2006.01)
(Continued)

(52) U.S. Cl.
CPC ................ *H04R 3/12* (2013.01); *H04R 5/02* (2013.01); *H04R 1/26* (2013.01);
(Continued)

(58) Field of Classification Search
CPC .. H04R 2420/07; H04R 1/02; H04R 2430/01; H04R 3/12; H04R 5/02; H04R 1/26;
(Continued)

(56) References Cited

U.S. PATENT DOCUMENTS

| | | | |
|---|---|---|---|
| 7,653,344 | B1 | 1/2010 | Feldman et al. |
| 7,840,983 | B1 | 11/2010 | Feldman et al. |

(Continued)

FOREIGN PATENT DOCUMENTS

| | | | |
|---|---|---|---|
| WO | 9923856 | A1 | 5/1999 |
| WO | 2008130328 | A1 | 10/2008 |

(Continued)

OTHER PUBLICATIONS

International Search Report dated May 6, 2014 for PCT International Application No. PCT/SE2013/051585, 4 pages.

(Continued)

*Primary Examiner* — Akelaw Teshale
(74) *Attorney, Agent, or Firm* — RMCK Law Group PLC

(57) ABSTRACT

The present invention relates to a wireless speaker arrangement. The present invention also relates to a wireless speaker system comprising at least a pair of such speaker arrangements, to a method for operating a wireless speaker arrangement and to a corresponding computer program product.

11 Claims, 4 Drawing Sheets

(51) Int. Cl.
*H04R 5/02* (2006.01)
*H04R 1/26* (2006.01)

(52) U.S. Cl.
CPC .... *H04R 2201/028* (2013.01); *H04R 2420/07* (2013.01); *H04R 2430/01* (2013.01)

(58) Field of Classification Search
CPC H04R 1/2834; H04R 2201/028; H04R 1/323; H04R 2205/022; H04R 3/00; H04R 27/00; H04R 2227/003; H04R 2205/021; H04R 2227/005; H04R 2205/024; H04R 2201/021; H04R 5/027; H04R 1/025; H04R 1/028
USPC .. 381/81, 77, 109, 300, 388, 79, 85, 303, 1, 381/17, 18, 186, 2, 26, 386, 387, 80, 92, 381/97, 98
See application file for complete search history.

(56) References Cited

U.S. PATENT DOCUMENTS

2006/0258289 A1 11/2006 Dua
2008/0120668 A1 5/2008 Yau
2009/0079883 A1* 3/2009 Banks .................... G09G 5/003 348/738
2010/0188212 A1* 7/2010 Jochelson ................ H04R 5/04 340/540
2010/0190532 A1 7/2010 Sampat et al.
2010/0226499 A1* 9/2010 De Bruijn .............. H04R 1/403 381/17
2010/0299639 A1* 11/2010 Ramsay ................ G06F 3/0486 715/835
2012/0058727 A1 3/2012 Cook
2013/0016870 A1 1/2013 Chen et al.
2013/0064388 A1* 3/2013 Jacobs ................... H04R 27/00 381/87

FOREIGN PATENT DOCUMENTS

WO 2009026590 A1 2/2009
WO 2009086599 A1 7/2009
WO 2009086602 A1 7/2009
WO 2009122142 A1 10/2009

OTHER PUBLICATIONS

EP Extended Search Report dated Jun. 8, 2016 for International Application No. 13869944.2 (7 pages).

* cited by examiner

WIRELESS SPEAKER ARRANGEMENT

CROSS-REFERENCE TO RELATED APPLICATIONS

This application is a 371 U.S. National Stage of International Application No. PCT/SE2013/051585, filed Dec. 20, 2013, which claims priority to Swedish Patent Application No. 1350011-1, filed Jan. 7, 2013. The disclosure of each of the above applications is incorporated herein by reference in their entirety.

TECHNICAL FIELD

The present invention relates to a wireless speaker arrangement. The present invention also relates to a wireless speaker system comprising at least a pair of such speaker arrangements, to a method for operating a wireless speaker arrangement and to a corresponding computer program product.

BACKGROUND OF THE INVENTION

A common trend within the field of speakers relates to providing wireless capabilities for improving the positioning of the speakers within a space, such as a living room, where audio is to be delivered to and consumed by a user. In such an environment, for example a pair of wireless speakers may be controlled by a common system controller allowing synchronized distribution of audio to the pair of speakers. Accordingly, in providing such a configuration the common system controller need not to be wired to each of speakers, but rather the provision of audio is achieved over a wireless link connecting each of the speakers to the common system controller.

An example of such a system configuration is disclosed in US2012058727A. In addition to the above general discussion, US2012058727A provides further improvement in regards to reliable wireless communication of synchronized audio between the common system controller and the pair of speakers. Specifically, US2012058727A disclose using a primary and a secondary wireless link, where the primary wireless link is provided for relaying audio information between a first and a second of the pair of wireless speakers, and the secondary wireless link provides a connection between an audio source and the first wireless speaker. As disclosed in US2012058727A, the audio source may for example be a mobile phone such as an iPhone, a computer or a specifically configured audio receiver where the pair of wireless speakers may be provided as a further extension to an already available plurality of speakers having a wired connection to the audio receiver.

However, even though US2012058727A illustrates improvements in relation to a wireless speaker system and the thereto related reliability of wireless communication of audio information, the introduction of two wireless links puts increased pressure on a user for setting up the system. For example, to be able to achieve a desired level of reliability in regards to the wireless communication, it may be necessary for the user to have a high level of knowledge as to possible disturbing further wireless sources to be taken into account once the system is to be set up.

Accordingly, there would be desirable to allow for further improvements in relation to operational usability for example stemming from simplified configurability of the wireless system, specifically taking into account the above mentioned problems. It may furthermore be desirable to take into account different social media services for improving the user experience and allow new ways of consuming audio related information.

SUMMARY OF THE INVENTION

According to a first aspect of the invention, the above is at least partly alleviated by a self-contained wireless speaker arrangement configured to deliver an audio experience to a user, the wireless speaker arrangement comprising an outer housing having a predefined volume and form factor, an electro-acoustic transducer comprising a plurality of matched speaker components, an amplifier connected to the electro-acoustic transducer and configured for converting audio information into sound, the amplifier comprising a plurality of amplifier components selected to match the plurality of speaker components of the electro-acoustic transducer; a first wireless transceiver module for providing a wireless Internet connection to the wireless speaker arrangement, digital storage means for providing a buffer for the audio information to be delivered by the wireless speaker arrangement, and a control unit connected to and configured to control the amplifier, the first wireless transceiver module and the digital storage means, wherein the electro-acoustic transducer, the amplifier, the first wireless transceiver module, the digital storage means and the control unit are positioned entirely within the outer housing, the selection of components of the electro-acoustic transducer and the amplifier are based on the volume and form factor of the outer housing for maximizing the quality of the audio experience delivered to the user, and the control unit is configured to receive information, using the Internet connection, from a remotely arranged server, and convert the received information into audio to be amplified using the amplifier and delivered to the user.

By means of the invention, it is possible to allow an improved audio experience using only a single self contained embedded device, where information may be directly provided to the wireless speaker arrangement from the Internet without having to rely on "pushing" audio based content to the speaker for example using your mobile phone or similar device. Accordingly, the wireless speaker arrangement according to the invention may instead act as a stand-alone device converting information received from a remote server to sound to be delivered to a user.

According to the invention, any kind of suitable information may be received from the remote server for the purpose of be converter to sound/audio to be presented to the user. That is, it may be possible to allow for the control unit to execute an (embedded/stand-alone) application (software), such as e.g. a Spotify® or a SoundCloud® client, which receives audio based information from the Internet and converts the received information to audio. However, it may also be possible to allow the control unit to interact with e.g. a cloud based application for receiving similar information to be converted to sound to be outputted by the electro-acoustic transducer.

As understood, the expression electro-acoustic transducer refers to any type of speaker element configured to convert audio information from the amplifier into sound waves. As such, the inventive wireless speaker arrangement may comprise a single or preferably a plurality of different speaker elements delivering sound within different overlapping frequency spectra. Also, the expression amplifier generally relates to an electronic active device (i.e. electrically powered for example from the mains) to amplify low level signals provided from the control unit to a corresponding signal suitable to be converted into sound by the speaker element(s). Still further, the expression digital storage means relates to any type of digital means for allowing information received using the Internet connection to be buffered before converted into sound being delivered to the user during operation of the wireless speaker arrangement. Based on the above discussion, in an alternative embodiment it may be possible to (also) connect "external" electro-acoustic transducer(s) to the wireless speaker arrangement.

In relation to the invention, the term remote server relates to a platform for providing audio, typically music, to the wireless speaker arrangement. However, different types of remote server arrangements are of course possible and within the scope of the invention. For example, it may be possible to allow the wireless speaker arrangement to be configured to convey also a written message to the user, including for example a "Tweet" (i.e. a Twitter® message). In such a case, the written message will be received by the control unit and the control unit may be further configured to implement a text-to-speech functionality to output the Tweet as a speech message. In addition, it may also be possible to embed a link within e.g. a Tweet (or any other type of message sent to the wireless speaker arrangement), and configure the control unit such that it requests the content presented at the web site corresponding to the link. Accordingly, in case the content is e.g. an audio file (or similarly), the wireless speaker arrangement may be configured to convert it to sound to be outputted by the electro-acoustic transducer. In a preferred embodiment the wireless speaker arrangement further comprises a second wireless transceiver module connected to the control unit and configured for allowing wireless communication between the wireless speaker arrangement and at least one further wireless speaker arrangement. Accordingly, by including such a wireless transceiver module one or even a large plurality of e.g. similar further wireless speaker arrangements may be connected to the wireless speaker arrangement.

As discussed above, the wireless speaker arrangement is defined to be self contained, however still allowing the speaker arrangement to be powered for example by connecting the speaker arrangement to the mains. In addition, for maximizing the audio experience provided to the user, the components used to implement the speaker arrangement are selected to match each other (matched components in regards to the transducer and the amplifier), at the same time optimizing the audio experience based on a form factor preselected for the speaker arrangement. Accordingly, the components of the speaker arrangement are selected as a function of the preselected form factor of the outer housing of the speaker arrangement, at the same time selected to match each other.

Accordingly, to be deliver a high quality audio experience to the user, the control unit is preferably further configured synchronize a timing parameter for the wireless speaker arrangement and the at least one further wireless speaker arrangement. Such a timing parameter allows e.g. the buffers or the control of the buffers of the different wireless speaker arrangements to be synchronized. The synchronization may for example dependent on a network time protocol (NTP), possibly having extensions in its determination based on transmitting a plurality of time stamped packets between the different wireless speaker arrangements. Other types of synchronization means may be applied, comprising for example the Precision Time Protocol (PTP) including different types of connected implementations such as for example PTPd. In addition, it may according to the invention be possible to combine different types of synchronization protocols.

In a possible implementation of the invention the functionality of the first and the second wireless transceiver module is provided using a single wireless transceiver circuitry. Other alternative implementations are of course possible and within the scope of the invention.

For achieving a high reliability in regards to delivery of at least a portion of the received information between the wireless speaker arrangement and the at least one further wireless speaker arrangement, the wireless communication protocol used for communication between the wireless speaker arrangement and the at least one further wireless speaker arrangement is preferably configured for allowing at least one of forward error correction and acknowledge-resend of the transmitted information. Other types of error correction protocols (present and/or future) for achieving high reliability of wirelessly transmitted information may of course be possible and is within the scope of the invention.

In an advantageous embodiment of the invention, the wireless speaker arrangement is provided as a master node and the at least one further wireless speaker arrangement is arranged as a slave node. Typically, the master node is the wireless speaker arrangement provided with a direct wireless Internet connection, possibly through a wireless router or similar device, whereas the slave node is connected (possibly only but directly without including e.g. the router in the communication) to the master node and hence not provided with a direct Internet connection. The determination of which of the wireless speaker arrangements should be arranged as the master node may be random, or may for example be based on maximizing the wireless reception in regards to the Internet connection as well as for providing an adequate level of wireless reception between the different wireless speaker arrangements. In addition, determining the master node may be depending on which of the wireless speaker arrangements is first powered-up, e.g. connected to the mains. Accordingly, in case the master node loses its supply of power (a burnt fuse, etc.) there is possible to allow for a reconfiguration where instead another wireless speaker arrangement is determined to be the master node.

Within the scope of the invention it is further possible to provide the wireless speaker arrangement with a unique identification, thereby allowing the wireless speaker arrangement to be identified by a remote server connected to the wireless speaker arrangement using the Internet connection. In accordance to such a configuration it may be possible to introduce device specific privileges for a specific wireless speaker arrangement. That is, it may for example be possible to acquire and/or allow the uniquely identified wireless speaker arrangement to access a specific remote server (platform) for example during a set duration. The uniquely identified wireless speaker arrangement may thereby be connected to for example a remote server broadcasting a live concert or similar event, where the audio at the remote concert site may be experienced within the comfort of the home environment, i.e. right within the living room of the user.

In addition, by using the unique identification it may also be possible to "push" information from any electronic audio based device/application to a specific wireless speaker arrangement according to the invention. For example, a first user having music on his/her mobile device may push the music to the wireless speaker arrangement of a second user. The information from the mobile device of the first user is typically relayed through a remote server to the wireless speaker arrangement of the second user.

The control unit of the wireless speaker arrangement may also be configured to log at least one parameter relating to the audio experience delivered to the user. Such parameters may for example include which music (i.e. songs) the user is listening to, the location of the user, the volume setting for a specific song, which playlist the user currently is listening to, etc. By means of the unique identification it may also be possible to categorize this information, allowing further expansions for example in relation to the creation of playlists based on aggregated/correlated information about different users within a predefined region (e.g. which music currently being played in New York, London, Paris, etc.). Similarly, aggregated/correlated information in relation to the volume settings may allow playlist to be created where only songs played having a volume setting above a predetermined threshold may be included.

In addition, the wireless speaker arrangement preferably comprises means connected to the control unit for the purpose of allowing a remote control to connect to the wireless speaker arrangement for controlling operation of the wireless speaker arrangement. The remote control, for example being a mobile device or a remote control specifically configured for the wireless speaker arrangement, may possible be directly connected to the wireless speaker arrangement (e.g. using a direct Bluetooth connection) for adjusting the volume settings, change songs, configure playlists, etc. However, the wireless speaker arrangement may also possibly be indirectly controlled, where the remote control is connected to the wireless speaker arrangement using the Internet connection and control commands possibly are relayed using the remotely connected server as discussed above.

In a possible implementation of the invention, such a remote control may be individually configured to allow for specific control of the wireless speaker arrangement. Specifically, it may be possible to for example allow for a plurality of different users (such as the persons in a family) to each have its individual and possibly color coded remote control (e.g. a different color for each user for easy accessibility), where each of the remote controls may allow for different control functionality of the wireless speaker arrangement. In a possible embodiment each of the individual remote may be configured to allow different individual playlists to be played. In an embodiment it may also be possible to make use of an unique identifier, possibly connectable to the remote control (such as a memory card, an RFID tag, a Bluetooth tag, etc.) allowing for individualization of different remote controls. Accordingly, it may be possible to for example allow a “unique tag” or a uniquely identifiable remote control to be purchased, where the “uniqueness” may allow for example specific privileges to the wireless speaker arrangement, similarly to the above discussion.

The wireless speaker arrangement as discussed above is preferably comprised within a wireless speaker system, where the wireless speaker system additionally comprises a further wireless speaker arrangement, the wireless speaker system thus being formed by two (essentially) corresponding wireless speaker arrangements. In such a configuration and as discussed above, one of the speakers (e.g. the first) is preferably arranged as the “master node” providing the possibly sole connection to the Internet, whereas the second speaker is provided as a “slave node” arranged to receive at least a portion of the information received from the Internet connected remote server. The individual wireless speaker arrangements of the wireless speaker system are preferably implemented using (essential) the same or similar hardware. Accordingly, the wireless speaker system could be seen as truly fully scalable, possibly running (essentially) the same software and possibly having interchangeable roles (as discussed above). Depending on the protocol used for communication between the different wireless speaker arrangements of the wireless speaker system (e.g. forward error correction), it would according to the invention be possible to scale the system to comprise a large plurality of wireless speaker arrangements with only limited overhead in regards to communication between the different wireless speaker arrangements.

According to another aspect of the present invention there is provided a method for operating a wireless speaker arrangement configured to deliver an audio experience to a user, the wireless speaker arrangement comprising a first wireless transceiver module for providing a wireless Internet connection to the wireless speaker arrangement, an outer housing having a predefined volume and form factor, an electro-acoustic transducer comprising a plurality of matched speaker components, and an amplifier connected to the electro-acoustic transducer and configured for converting audio information into sound, the amplifier comprising a plurality of amplifier components selected to match the plurality of speaker components of the electro-acoustic transducer, wherein the electro-acoustic transducer, the amplifier, the first wireless transceiver module, the digital storage means and the control unit are positioned entirely within the outer housing, and the selection of components of the electro-acoustic transducer and the amplifier are based on the volume and form factor of the outer housing for maximizing the quality of the audio experience delivered to the user, wherein the method comprises receiving information, using the Internet connection, from a remotely arranged server, and converting the received information into audio to be amplified using the amplifier and delivered the user.

The invention is preferably provided on a computer-readable storage medium storing a program which causes a computer to execute a method for operating a wireless speaker arrangement as discussed above.

According to further aspect of the invention there is provided a computer program product comprising a computer readable medium having stored thereon computer program means for controlling a wireless speaker arrangement to deliver an audio experience to a user, the wireless speaker arrangement comprising a first wireless transceiver module for providing a wireless Internet connection to the wireless speaker arrangement, an outer housing having a predefined volume and form factor, an electro-acoustic transducer comprising a plurality of matched speaker components, and an amplifier connected to the electro-acoustic transducer and configured for converting audio information into sound, the amplifier comprising a plurality of amplifier components selected to match the plurality of speaker components of the electro-acoustic transducer, wherein the electro-acoustic transducer, the amplifier, the first wireless transceiver module, the digital storage means and the control unit are positioned entirely within the outer housing, and the selection of components of the electro-acoustic transducer and the amplifier are based on the volume and form factor of the outer housing for maximizing the quality of the audio experience delivered to the user, wherein the computer program product comprises code for receiving information, using the Internet connection, from a remotely arranged server, and code for converting the received information into audio to be amplified using the amplifier and delivered to the user.

As discussed above, the wireless speaker arrangement preferably comprises a control unit, including for example a generic type of processor, a micro processor or any other type of computing device. Similarly, the computer readable medium may be any type of memory device, including one of a removable nonvolatile random access memory, a hard disk drive, a USB memory, an SD memory card, or a similar computer readable medium known in the art.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1A:
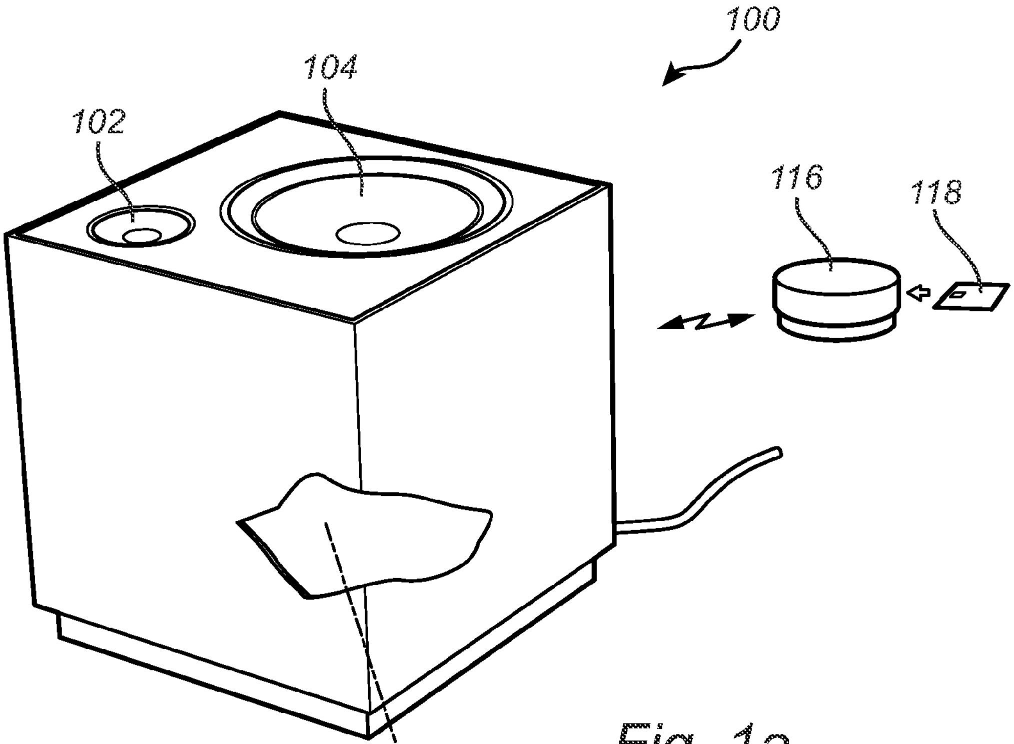
FIGS. 1*a* and 1*b* illustrate a conceptual as well as a detailed view of a wireless speaker arrangement according to a currently preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1B:
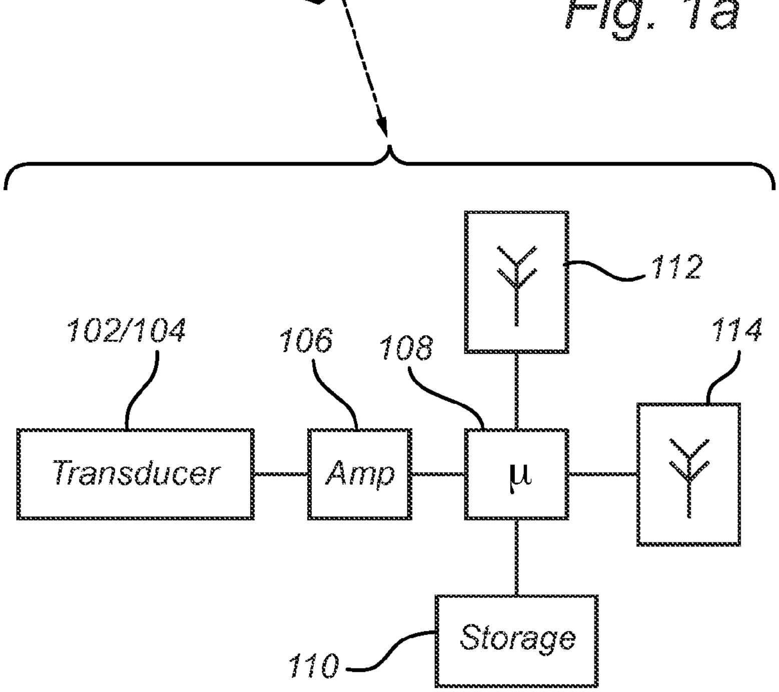

Referring now to the drawings and to FIGS. 1*a* and 1*b* in particular, there is depicted a wireless speaker arrangement 100. The wireless speaker arrangement 100 comprises in the illustrated embodiment a plurality of speaker elements (transducers) 102 and 104, for example configured for different, possibly overlapping frequency spectrums. Furthermore, the wireless speaker arrangement 100 comprises an amplifier 106 and a control unit 108, arranged in electrical connection with each other. The control unit 108 may include a microprocessor, a microcontroller, a programmable digital signal processor or another programmable device. The control unit 108 may also, or instead, include an application specific integrated circuit (ASIC), a programmable gate array programmable array logic, a programmable logic device, or a digital signal processor. Where the control unit 108 includes a programmable device such as the microprocessor or microcontroller mentioned above, the processor may further include computer executable code that controls operation of the programmable device.

The control unit 104 is typically, and as is illustrated in FIG. 1*b*, connected to storage means 110, allowing computer executable code and other information to be digitally stored. In some implementations the storage means 110 may be integrated with the control unit 108. In addition, the wireless speaker arrangement 100 further comprises a first 112 and a second 114 wireless transceiver module connected to the control unit 106 and configured for allowing wireless communication to and from the wireless speaker arrangement 100. In a typical embodiment of the illustrated wireless speaker arrangement 100, the first 112 wireless transceiver module allowing the wireless speaker arrangement 100 to be connected to the Internet (e.g. through a router), whereas the second 114 wireless transceiver module allows a plurality of further (but preferably similar) wireless speaker arrangements to be connected to the wireless speaker arrangement 100.

In the illustrated embodiment of FIG. 1*a*, a remote control 116 is disclosed for allowing control of wireless speaker arrangement 100; including for example adjusting the volume settings, change songs, configure playlists, etc.

However, the wireless speaker arrangement 100 may alternatively or also be configured to be "indirectly controlled", where the remote control or a similar device (e.g. a computer or other electronic device being mobile or stationary) is connected to the wireless speaker arrangement 100 "over the Internet" using the Internet connection. In such a case, typically implemented using a cloud service, initial control commands may be provided from the control device (i.e. the computer, electronic device, or similar) to the cloud service (e.g. a cloud server) where they in turn are converted and provided (again over the Internet) to the wireless speaker arrangement 100. Accordingly, instead of provided the wireless speaker arrangement 100 with for example a web server and allowing the user to "browse" to this server, all such functionality may be provided at the cloud service, reducing computational load from the wireless speaker arrangement 100, and move such handling to the cloud service. Such an implementation also reduces any user handling/updates of the wireless speaker arrangement 100 since such updates handling instead may be provided in relation to the cloud service. The connection between the wireless speaker arrangement 100 and remote servers/cloud services will be discussed further below.

As mentioned above, the remote control 116 may be individualized, for example with a "unique tag". In the illustrated embodiment the individualization is provided using a memory card 118 (or similar). Other means for individualizing the remote control (including specifically programmed features of the remote control 116) is possible and within the scope of the invention.

Figure 2:
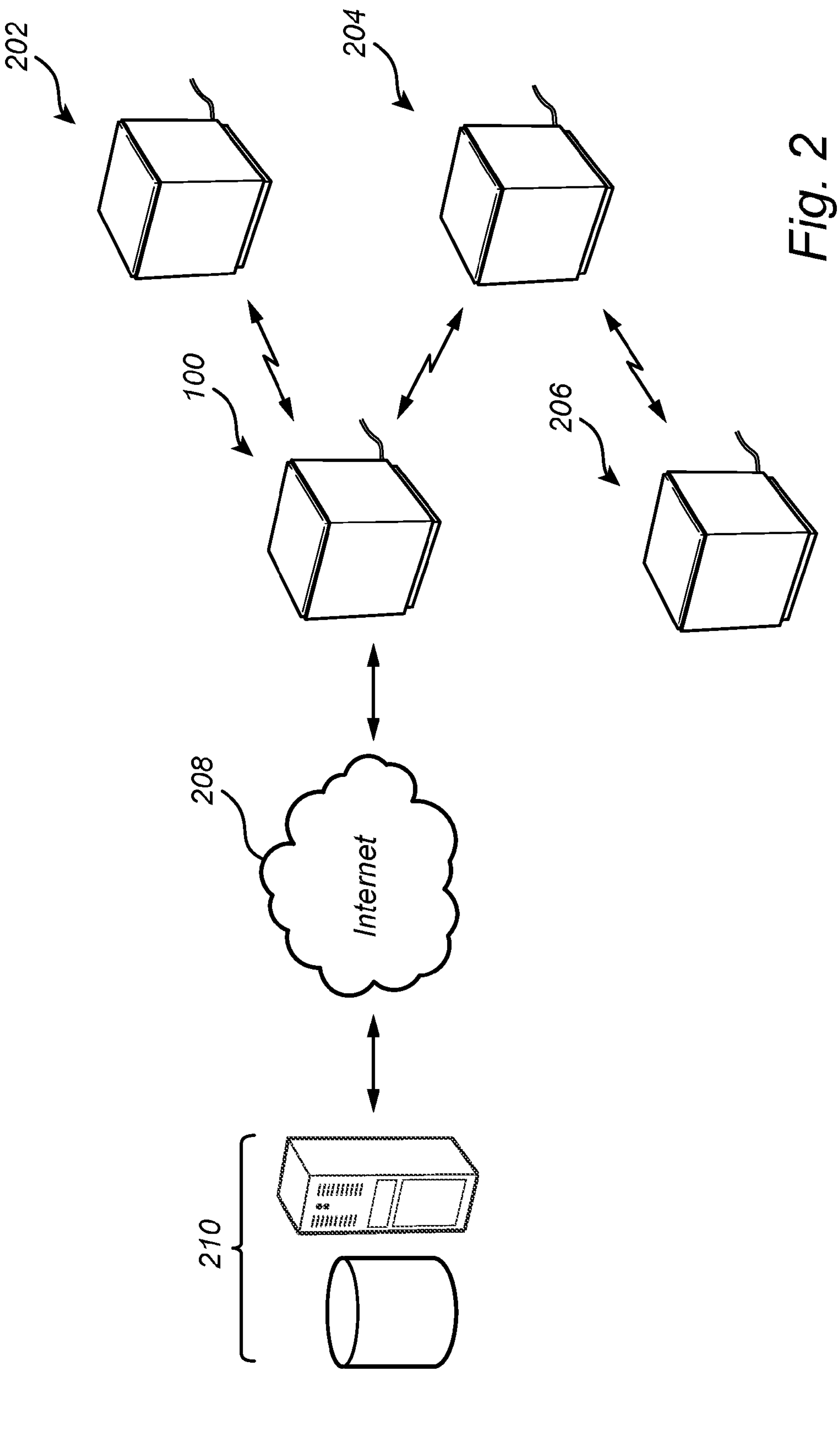
FIG. 2 illustrates a wireless speaker system according to the invention.

Turning now to FIG. 2, which illustrates a wireless speaker system 200, comprising a plurality of wireless speaker arrangement as shown in FIG. 1. In the illustrated embodiment, the wireless speaker system 200 comprises four individual but typically similarly (hardware and software) configured wireless speaker arrangement 100, 202, 204, 206. As understood, any number of wireless speaker arrangements may be possible. In FIG. 2, the wireless speaker arrangement 100 is arranged as a master node, having a direct connection to the Internet 208, in turn allowing the wireless speaker arrangement 100 to be e.g. connected to a remote server/database arrangement 210.

Acting as a master node, the wireless speaker arrangement 100 organizes an internal network allowing the wireless speaker arrangements 100, 202, 204, 206 to in some way be connected to each other. In an embodiment, the wireless speaker arrangements 100 may be arranged to connect to each of the remaining wireless speaker arrangements 202,

204, 206. Alternatively and as is illustrated in FIG. 2, the wireless speaker arrangements 100 may be directly connected to the wireless speaker arrangements 202, 204, and information received by the wireless speaker arrangement 204 may be forwarded (e.g. relayed) to the wireless speaker arrangement 206. Other means for forming a wirelessly connected wireless speaker system 200 comprising a plurality of wireless speaker arrangements 100, 202, 204, 206 is of course possible and within the scope of the invention.

During operation of the wireless speaker system 200, one of the wireless speaker arrangement 100 is set as the master node, whereas the remaining wireless speaker arrangements 202, 204, 206 are arranged as slave nodes. In case a user, for example using the remote control 116, initiates a listening session connected to a specific playlist, the master node 100 connects, using the Internet connection 208, to the remote server 210 for requesting audio related information corresponding to the specific playlist. Possibly, the control unit 108 converts the audio related information to signals to be amplified by the amplifier 108 and provided to the user using the speaker elements 102, 104.

As the slave nodes 202, 204, 206 are connected to the master node 100; the audio related information from the remote server 210 is also conveyed to the slave nodes 202, 204, 206 where a similar process takes place, such that the user is presented with e.g. music from the playlist throughout all of the wireless speaker arrangements 100, 202, 204, 206. For allowing the music to be synchronized, i.e. without any user apparent time lags, the wireless speaker arrangements 100, 202, 204, 206 are thoroughly synchronized with each other. In addition, the communication between the wireless speaker arrangements 100, 202, 204, 206 is arranged such that the presence of any delay preferably is reduced.

Figure 3:
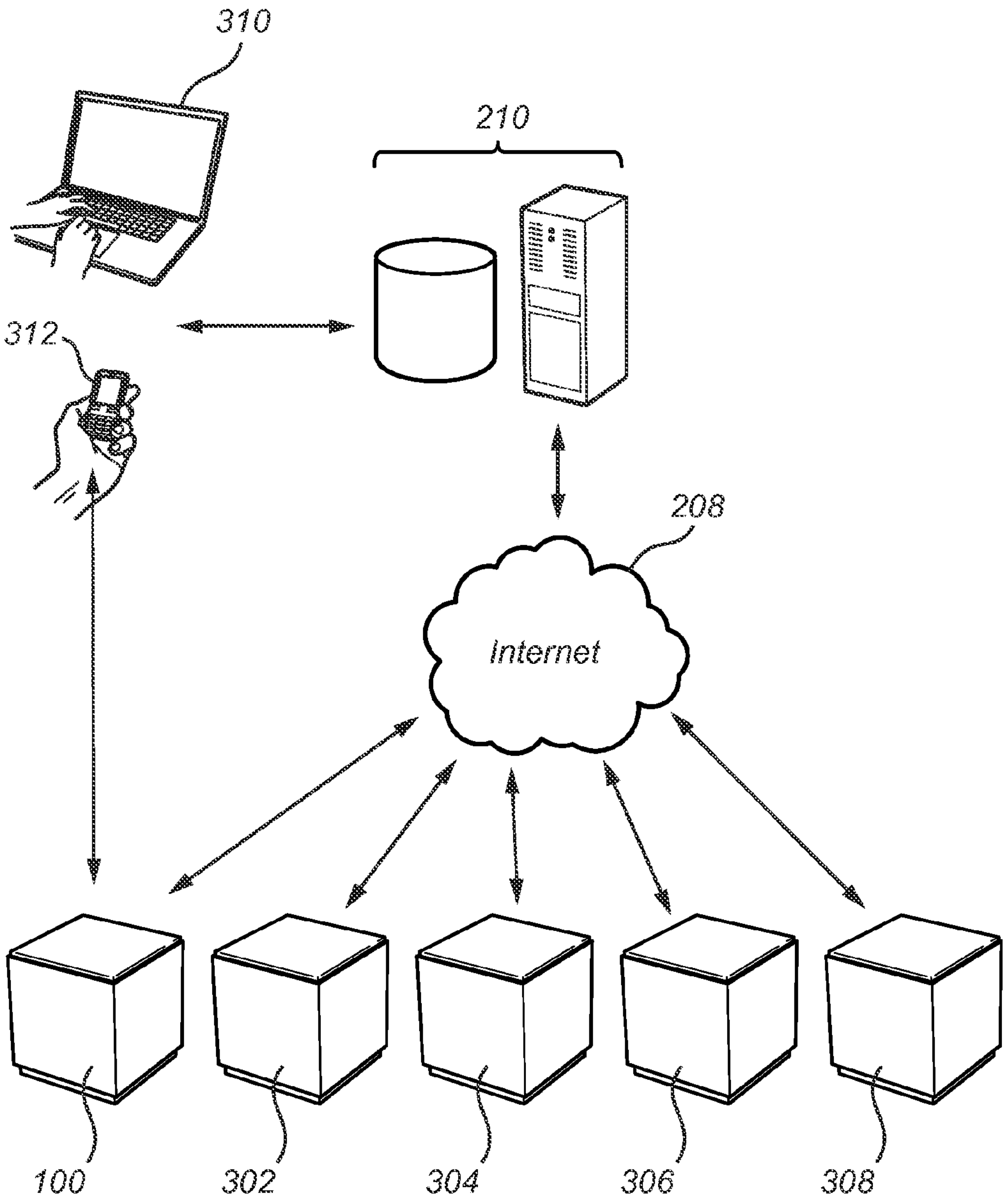
FIGS. 3 and 4 show a first and a second exemplary configuration of the invention in relation to distribution of information to a uniquely identified Internet connected wireless speaker arrangement.

In FIG. 3 there is depicted a possible scenario in which the inventive concept may be applied. In the illustrated embodiment a plurality of wireless speaker arrangements 100, 302, 304, 306 are shown, in this embodiment for example provided at different (e.g. distant) geographical locations and thus possibly each functioning as a master node connected to a plurality of further wireless speaker arrangements at each individual location. As understood, any number of wireless speaker arrangements may be possible.

The wireless speaker arrangements 100, 302, 304, 306 are also in this case connected to the remote server 210 using the Internet connection 208. However, in the illustrated embodiment a further device, such as a computer 310 may be connected to the remote server 210, possibly allowing control of a specifically identified wireless speaker arrangement. In an exemplary case, the computer 310 may be configured to connect to and control the wireless speaker arrangement 100. For example, the computer 310 may be configured to update playlists (possibly stored on either of the remote server 210 and/or the wireless speaker arrangement 100). Further devices may be connected to the server 210, including for example a mobile phone 312. It should however be noted that the mobile phone 312 also may be directly connected to one of the wireless speaker arrangements 100, 302, 304, 306, for example using a Bluetooth connection (e.g. provided as a functionality of both the mobile phone 312 and the wireless speaker arrangement). Other types of connections are of course possible and within the scope of the invention.

As discussed above, as the wireless speaker arrangements 100, 302, 304, 306 typically (each) are provided with a unique identifier, it may be possible to collect information as e.g. to the geographical location and use of the wireless speaker arrangement, including for example which songs are being played, intensity (i.e. number of times) a specific song is played and at what volume level a specific song is being played. Such information may e.g. be sent back, using the Internet connection 208, to the remote server 210 and stored on the database for allowing further processing, including compiling e.g. geographically dependent, song intensity dependent, volume level dependent playlists or a combination thereof.

Figure 4:
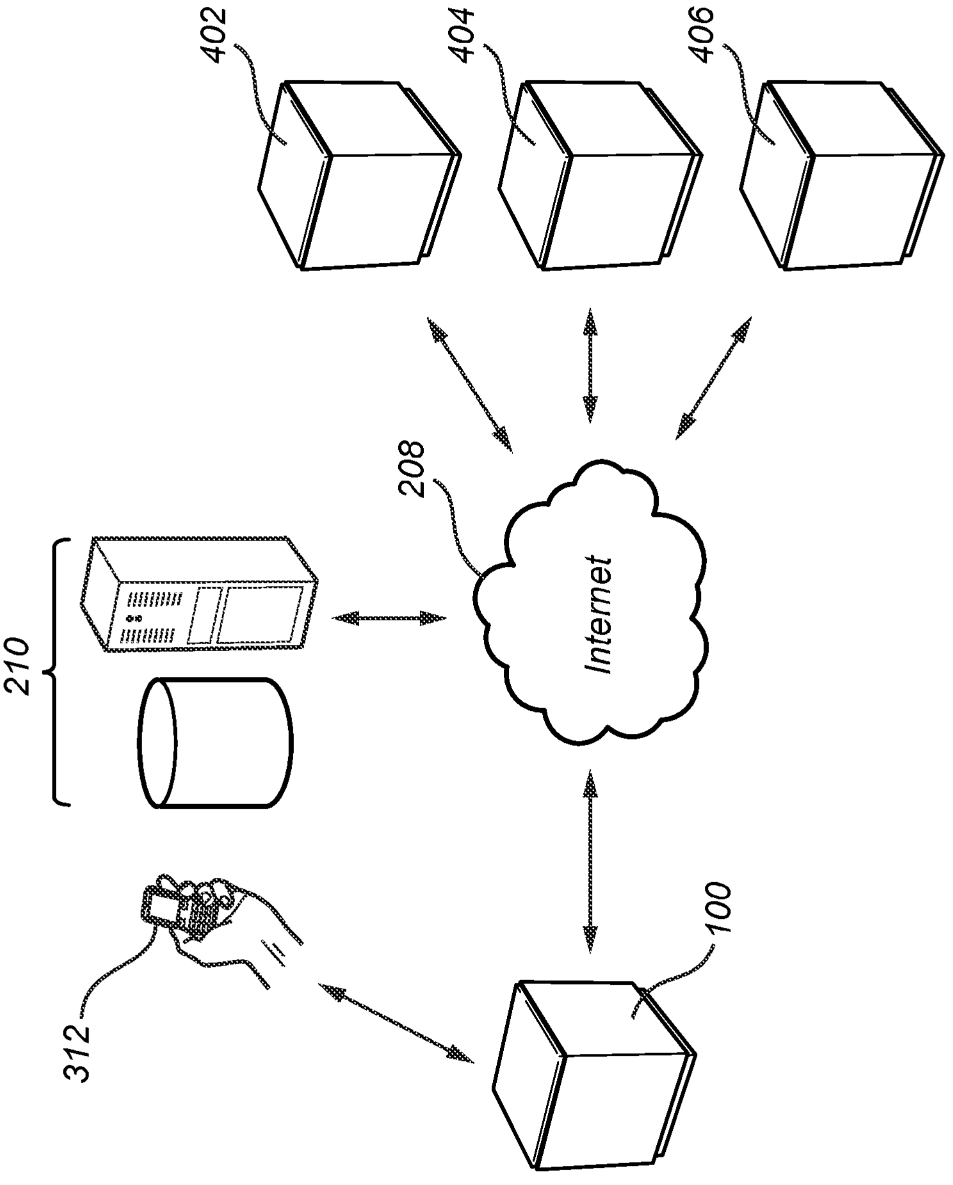

Turning finally to FIG. 4 illustrating a further possible scenario in which the inventive concept may be applied. In the illustrated embodiment again a plurality of wireless speaker arrangements 100, 402, 404, 406 are shown. As understood, any number of wireless speaker arrangements may be possible. However, in this embodiment it may be possible to allow e.g. audio related data that normally only is played on the first wireless speaker arrangement 100 to also be played also on further wireless speaker arrangements 402, 404, 406, possibly located at different geographical locations as compared to the location of the first wireless speaker arrangement 100. It may accordingly be possible, and within the scope of the invention, to control the wireless speaker arrangement 100, for example using the mobile device 312, to play a selected song, playlist and/or any other type of information also on all (or a selected few) of the wireless speaker arrangements 402, 404, 406.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word “comprising” does not exclude other elements or steps, and the indefinite article “a” or “an” does not exclude a plurality.

The invention claimed is:

1. A self-contained wireless speaker arrangement configured to deliver an audio experience to a user, the wireless speaker arrangement comprising:

an outer housing having a predefined volume and form factor;

an electro-acoustic transducer comprising a plurality of matched speaker components;

an amplifier connected to the electro-acoustic transducer and configured for converting audio information into sound, the amplifier comprising a plurality of amplifier components selected to match the plurality of matched speaker components of the electro-acoustic transducer;

a first wireless transceiver module for providing a wireless Internet connection to the wireless speaker arrangement;

a digital storage device for providing a buffer for the audio information to be delivered by the wireless speaker arrangement, and a control unit connected to and configured to control the amplifier, the first wireless transceiver module and the digital storage device, wherein the electro-acoustic transducer, the amplifier, the first wireless transceiver module, the digital storage device and the control unit are positioned entirely within the outer housing, the selection of components of the electro-acoustic transducer and the amplifier are based on the volume and form factor of the outer housing for maximizing quality of the audio experience delivered to the user, and the control unit is configured to:

receive information, using the Internet connection, from a remotely arranged server, convert the received information into audio to be amplified using the amplifier and delivered to the user, allow a remote control to connect to the wireless speaker arrangement for controlling operation of the wireless speaker arrangement, and distinguish between a plurality of individual remote controls, thereby allowing for different control functionality of the wireless speaker arrangement for each of the plurality of individual remote controls, wherein the plurality of individual remote controls are each configured to access different individual playlists to be played by the wireless speaker arrangement.

2. The wireless speaker arrangement according to claim 1, further comprising a second wireless transceiver module connected to the control unit and configured for allowing wireless communication between the wireless speaker arrangement and at least one further wireless speaker arrangement.

3. The wireless speaker arrangement according to claim 2, wherein functionality of the first and the second wireless transceiver module is provided using a single wireless transceiver circuitry.

4. The wireless speaker arrangement according to claim 2, wherein the control unit is further configured to:

synchronize a timing parameter for the wireless speaker arrangement and the at least one further wireless speaker arrangement;

transmit at least a portion of the received information to the at least one further wireless speaker arrangement for buffering using a digital storage device of the at least one further wireless speaker arrangement, and deliver sound to the user using the wireless speaker arrangement and the at least one further wireless speaker arrangement in a synchronized manner.

5. The wireless speaker arrangement according to claim 2, wherein the wireless speaker arrangement is provided as a master node and the at least one further wireless speaker arrangement is arranged as a slave node.

6. The wireless speaker arrangement according to claim 4, wherein the wireless communication between the wireless speaker arrangement and the at least one further wireless speaker arrangement is provided using at least one of a protocol allowing forward error correction and acknowledge-resend of the transmitted information.

7. The wireless speaker arrangement according to claim 2, wherein the control unit is further configured to execute at least one of an embedded or a cloud based application for receiving information from the remotely arranged server.

8. The wireless speaker arrangement according to claim 2, wherein the wireless speaker arrangement is provided with a unique identification, thereby allowing the wireless speaker arrangement to be identified by the remotely arranged server connected to the wireless speaker arrangement using the Internet connection.

9. The wireless speaker arrangement according to claim 8, wherein the control unit is configured to log at least one parameter relating to the audio experience delivered to the user and to provide at least a portion of the logged information to the remotely arranged server.

10. A wireless speaker system, the wireless speaker system comprising:

a first wireless speaker arrangement according claim 2, and a second wireless speaker arrangement according to claim 2, wherein the first wireless speaker arrangement is configured as a master node for receiving the received information using the Internet connection, and the second wireless speaker arrangement is configured to receive at least a portion of the received information directly from the first wireless speaker arrangement.

11. The wireless speaker arrangement according to claim 1, wherein each of the plurality of remote controls is provided with a unique identifier.

* * * * *